United States Patent [19]

Price

[11] Patent Number: 4,732,200
[45] Date of Patent: Mar. 22, 1988

[54] TIRE INFLATION DEVICE

[76] Inventor: Donald R. Price, 210 Elvin Ct., Lansing, Mich. 48912

[21] Appl. No.: 512,610

[22] Filed: Jul. 11, 1983

[51] Int. Cl.[4] ............................................. B60C 25/00
[52] U.S. Cl. ..................................................... 157/1.1
[58] Field of Search ...................................... 157/1, 1.1

[56] References Cited

U.S. PATENT DOCUMENTS 3,658,109  4/1972  Kaminskas et al. .................. 151/1.1
4,019,553  4/1977  Lefgren ................................. 157/1.1

*Primary Examiner*—Debra Meislin
*Attorney, Agent, or Firm*—Ian C. McLeod

[57] ABSTRACT

An inflation device (10, 20) for tubeless tires (200) is described. The device fits with an edge (12, 24) between the heel (201) and toe (202) of the bead (206) on the inside of the rim (101) with an inside wide side (11a, 21a) on the wheel rim flange so as to provide a temporary seal for airing of the tire. The device is expelled from between the bead and flange as a result of the airing of the tire.

14 Claims, 12 Drawing Figures

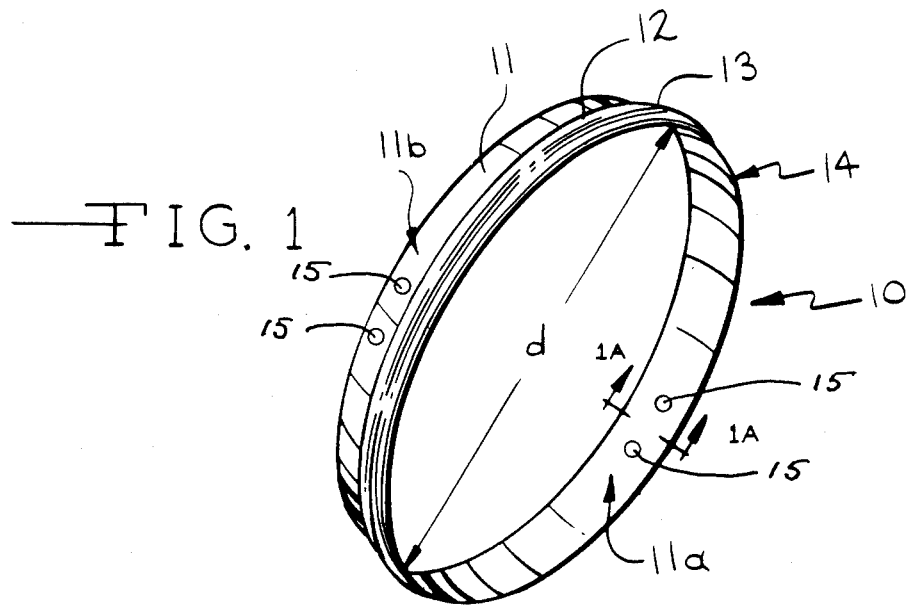
FIG. 1
FIG. 1A
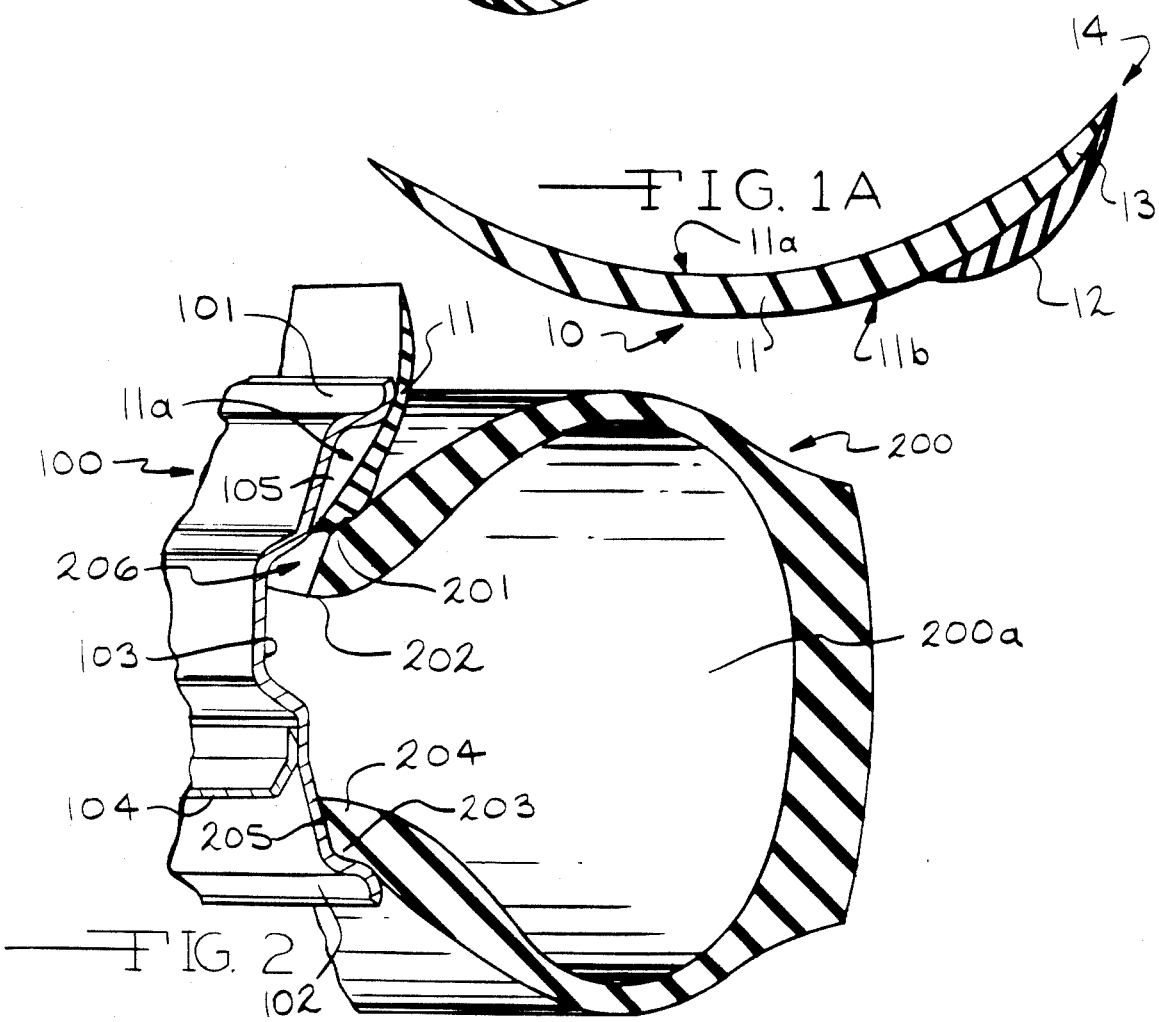
FIG. 2

4,732,200

TIRE INFLATION DEVICE

BACKGROUND OF THE INVENTION

(1) Field of the Invention

The present invention relates to a tire inflation device (10) for airing tubeless tires (200) on a wheel rim (100). In particular, the present invention relates to an inflation device which has an edge (14) which fits between the toe (202) and heel (201) of the tire bead (206) and on the wheel rim during airing of the tire and which is expelled from the rim upon airing of the tire.

(2) Prior Art

The prior art has shown various types of tubeless tire inflation devices. The simplest devices mount around the flange of the rim to seal the space between the sidewall of the tire and the flange during airing. Illustrative are the devices shown in U.S. Pat. Nos. 3,081,816 to Branick; 3,596,698 to Jordan; 3,651,849 to Kaminskas and 3,974,005 to Graml. These devices tend to be caught between the flange and the sidewall of the tire and then cannot be removed from the aired tire and/or do not provide an adequate enough seal during airing of the tire. The prior art has thus used machines which air the tires such as shown in U.S. Pat. Nos. 3,805,871 to Corless; 4,183,392 to Kane; 4,245,686 to Holladay and 4,263,958 to Corless. These machines work well but are relatively very expensive to acquire and operate in comparison to the inflation devices.

The most conventional practice in airing large truck tires is to introduce gaseous ether inside the tire mounted on a wheel rim and then ignite it to force the sidewall and bead of the tire up into the flange of the wheel rim while airing the tire. This is a very dangerous practice.

OBJECTS

It is therefore an object of the present invention to provide an inflation device which can not be caught between the sidewall or bead of the tire and the flange of the wheel rim and which provides a good seal between the bead and the rim during inflation of the tire.

It is also an object of the present invention to provide a device which is simple and inexpensive to construct. These and other objects will become increasingly apparent by reference to the following description and the drawings.

IN THE DRAWINGS

FIG. 1 is a front isometric view of the inflation device (10) of the present invention and FIG. 1A is a cross-section thereof.

FIGS. 2 to 5 show the steps in the airing of a tire using the inflation device (10) of FIG. 1A.

GENERAL DESCRIPTION

Figures 3, 4, 5:
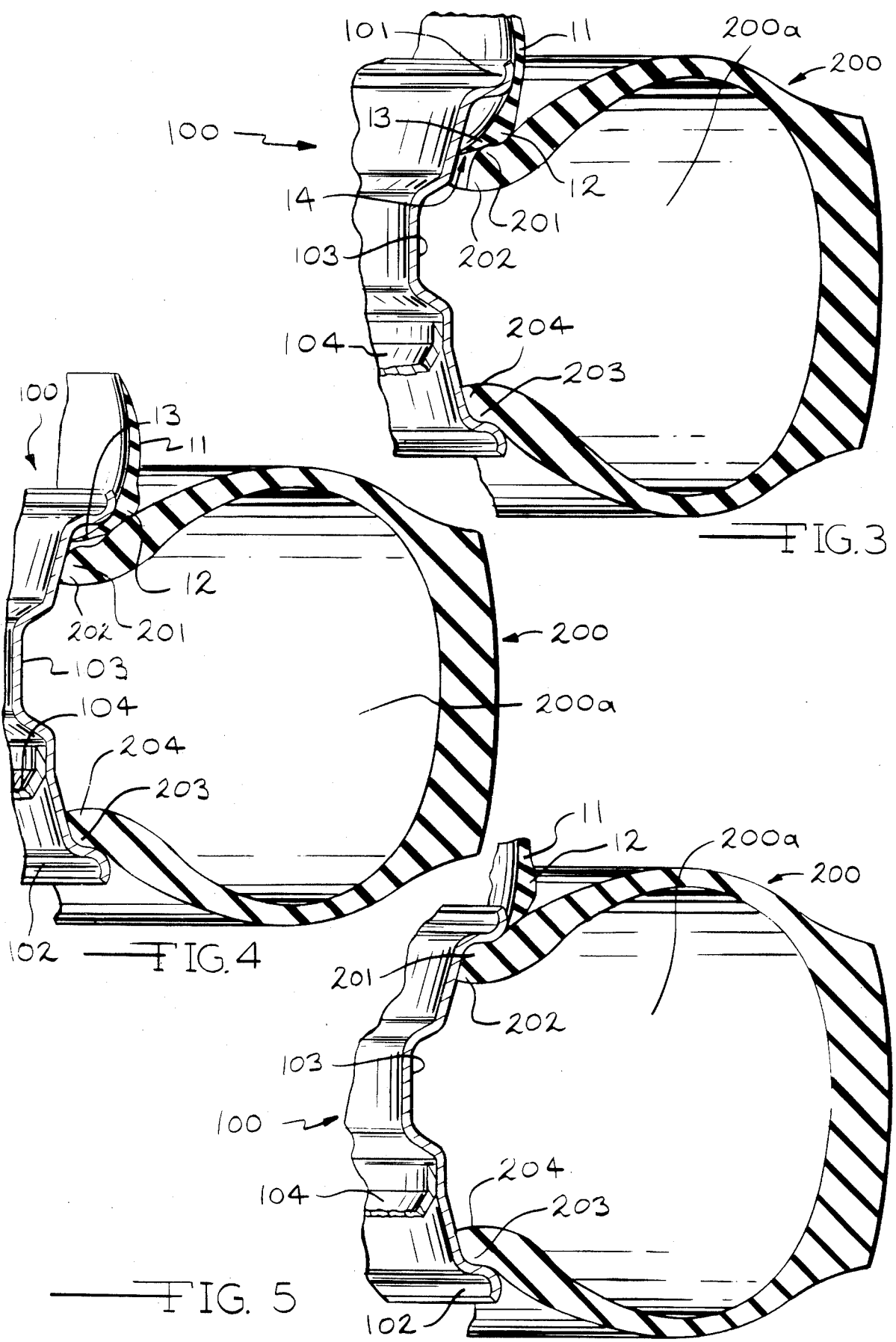

The present invention relates to a device for inflating a tubeless tire (200) having two spaced apart sidewalls supporting a tread and beads (205, 206) on the sidewalls for mounting the tire on a wheel rim (100) having a longitudinal axis upon which the wheel rim and mounted tire rotate, wherein the wheel rim has two spaced apart flanges (101, 102) which engage the beads of the tire at a radial periphery of the rim from the axis and wherein the bead has a heel portion (201, 203) on the bead which is outside of the tire and a toe portion (202, 204) on the bead which is inside of the tire which comprises:

(a) an annular body portion (11, 21) with two opposing wide sides (11a, 11b, 21a, 21b) such that the body portion has an elongate cross-section, wherein one side (11a, 21a) is inside the annulus and has a diameter (d) so as to frictionally engage the flange of the wheel rim and wherein the other side (11b, 21b) is on the side of the annulus; and (b) an annular tapered portion (13, 26) formed by the wide sides of the body portion having an annular edge (14, 24) which can engage the rim, wherein in use the device is mounted around one of the flanges of the wheel rim in contact with the heel of the bead such that (1) prior to inflation of the tire, the tapered portion of the device fits between the bead and tire rim with the outside side resting on the heel portion of the bead and with the edge on the rim, (2) during inflation of the tire, the heel of the bead on the outside side moves the device towards the flange upon which the device is mounted and (3) upon inflation as the heel and toe of the bead seats on the flange the device is expelled from between the bead and the rim and separated from the wheel rim.

The tire inflation device preferably has a raised portion (12, 23) adjacent to the edge on the outside side (11b, 21b) of the annulus. Preferably the raised portion (12, 23) is annular around the inflation device.

The present invention also relates to the method of inflating a tubeless tire (200) having two spaced apart sidewalls supporting a tread and beads (205, 206) on the sidewalls for mounting the tire on a wheel rim (100) having a longitudinal axis upon which the wheel rim and mounted tire rotate, wherein the wheel rim has two spaced apart flanges (101, 102) which engage the beads of the tire at a radial periphery of the rim from the axis and wherein the bead has a heel portion (201, 203) on the bead which is outside of the tire and a toe portion (202, 204) on the bead which is inside of the tire which comprises:

(a) providing an inflation device including an annular body portion (11, 21) with two opposing wide sides (11a, 11b, 21a, 21b) such that the body portion has an elongate cross-section, wherein one side (11a, 21a) is inside the annulus and has a diameter (d) so as to frictionally engage the flange of the wheel rim;

an annular tapered portion (13, 26) formed by the wide sides of the body portion having an annular edge (14, 24) which can engage the rim: and a raised portion (12, 23) adjacent the tapered portion on the body portion which can form a seal with the heel of the bead, wherein in use the device is mounted around one of the flanges of the wheel rim in contact with the heel of the bead such that (1) prior to inflation of the tire, the tapered portion of the device fits between the bead and tire rim with the raised portion resting on the heel portion of the bead and with the edge between the heel and the toe of the bead on the rim, (2) during inflation of the tire, the heel of the bead on the raised portion moves the device towards the flange upon which the device is mounted and (3) upon inflation as the heel and toe of the bead seats on the flange the device is expelled from between the bead and the rim and separated from the wheel rim;

(b) mounting the device around the flange with the raised portion in contact with the heel of the bead and the edge in contact with the rim; and (c) inflating the tire on the wheel rim so that the bead engages the flange and expells the device from between the bead and the rim.

The present invention also relates to the method for forming a tire inflation device which comprises:

(a) providing a strip of curable rubber having two wide sides (302a, 302b) tapered (303a) towards each other to form at least one short side (302c) and with a raised portion (304) of a second softer uncured rubber adjacent to the short side, the strip having opposite ends (302e, 302f);

(b) joining the ends of the strip to form an annular strip;

(c) providing the uncured annular strip and uncured rubber in a closed mold (300, 301, 306); and (d) curing the rubber to form the inflation device.

SPECIFIC DESCRIPTION

FIGS. 1 and 1A show an inflation device 10 including a body portion 11, annular raised portion 12, annular taper portion 13 and annular edge 14. The device 10 has a diameter d on the inside wide side 11a which is preferably concave which approximately corresponds to the diameter d of the flange 101 of rim 100. The outside wide side 11b is spaced from the inside wide side 11a so as to provide a suitable thickness, of preferably between about 0.25 and 0.50 inch (0.63 and 1.27 cm) at its thickest point. The device 10 is generally constructed of a flexible and elastic material such as rubber. The raised portion 12 can be molded onto the body portion 11 or can be integral with the body portion 11; however, the former is preferred. Similarly the body portion 11 and tapered portion 13 can be two separate parts joined together or can be integral. Brass reinforced rings 15 are provided on each side of the device 10 to aid in handling and for carrying of the device 10 when not in use.

FIGS. 2 to 5 show how a tire 200 is mounted on the rim 100 on upper and lower flanges 101 and 102. As shown with the rim 100 in a horizontal position, the lower flange 102 supports heel 203 and toe 204 of bead 205 of the tire 200 so that there can be a seal between them. The upper bead 206 is separated from the rim 100 adjacent the well 103. Without the inflation device 10 it is extremely difficult to hold air in the space 200a inside the tire 200, particularly for truck tires having the sizes 14.5, 16.5, 17.5, 19.5, 22.5 and 24.5.

As shown in FIG. 2, for airing the tire 200, the inflation device 10 is positioned on the rim 100 with the inside wide side 11a in contact with the upper flange 101 and with the edge 14 preferably on the tapered portion 105 on the inside of the rim 100 such that the tapered portion 13 is between the upper heel 201 and toe 202 of the bead 206, thus sealing the space between bead 206 and the inside of the rim 100. During inflation of the tire 200 by providing air in the space 200a, as shown in FIGS. 2 and 3, the upper bead 206 bears on the raised portion 12 of the device 10 and pushes it upward on the inside surface 11a of the body 11 so that the tapered portion 13 moves towards the upper flange 101. Removal is facilitated by air compressed between the device 10 and the rim 100. As the upper bead 201 approaches the upper flange 101 the device 10 begins to be expelled from between the bead 206 and the rim 101. As shown in FIG. 5, the device 10 is completely separated from the rim 100 when sufficient air is provided in the space 200a in the tire 200.

As shown in FIGS. 2 to 5, the lower flange 102 is adjacent to the hub portion 104 of the rim 100. The reason for this is that for most truck tires the upper flange 101 has a slightly different construction than the lower flange 102 for ease of mounting of the tire 200. Also generally the hub 104 and rim 100 are horizontally mounted on a conventional tire mounting device (not shown) for support on the vertically oriented central axis of the rim 100 which mounts on the wheel spindle of the vehicle. All of this is known to those skilled in the art.

In the preferred device for a truck rim 100 having a flange 23.5 inches in diameter at its most radial point, the device 10 has a diameter d which is between about 18 and 23 inches assuming it is composed of a flexible and elastic material such as rubber. A polyurethane ruber impregnated with a lubricant is preferred to provide ease of sliding of the side 11a on the rim 100, otherwise a conventional tire soap solution is used during mounting of the tire 200.

The preferred method for preparing the tire inflation device 10 of the present invention is by molding uncured rubber. The body portion 11 is composed of a rubber which cures to between a 75 to 85 Durometer (D) hardness preferably about 78D. The raised portion 12 is composed of a softer rubber preferably between about 55 and 65 D. To a certain extent the rubber of the body portion 11 and raised portion 12 flows upon molding. Alternatively the device 10 can be composed of a single strip of rubber which is molded.

Figure 6A:
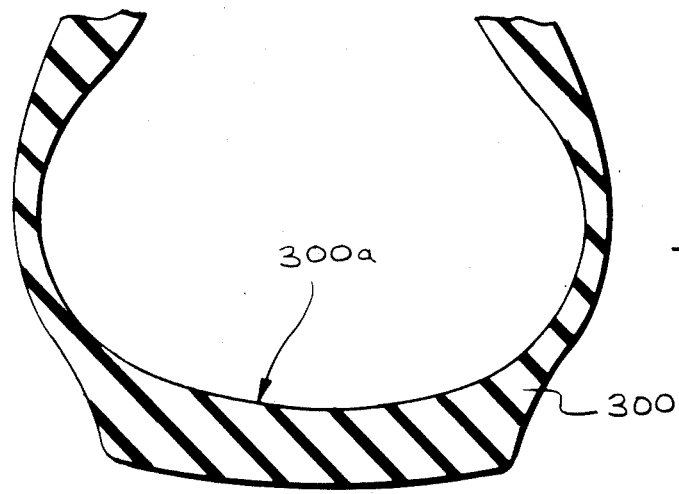
FIGS. 6A to 6E and FIG. 7 show the preferred method for producing the preferred inflation device (20) of the present invention.
Figure 6B:
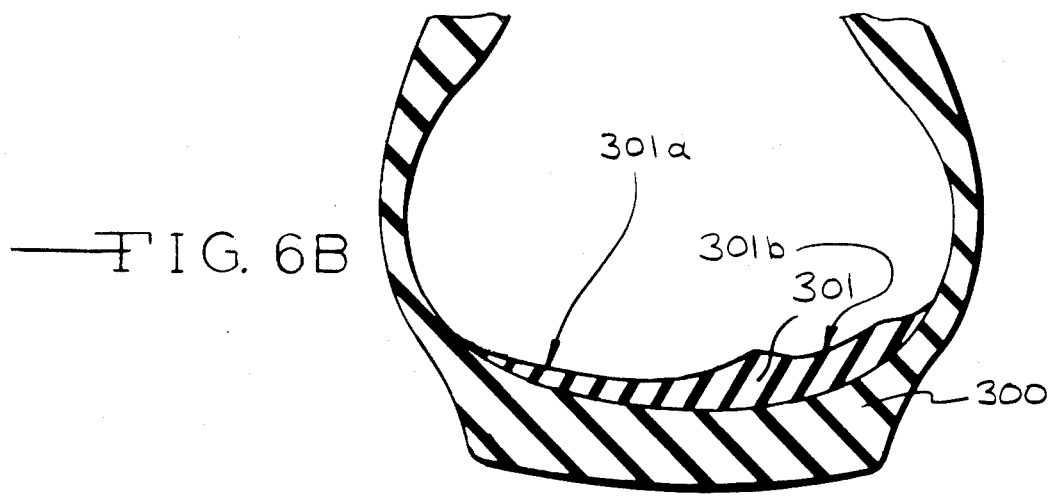
Figure 6C:
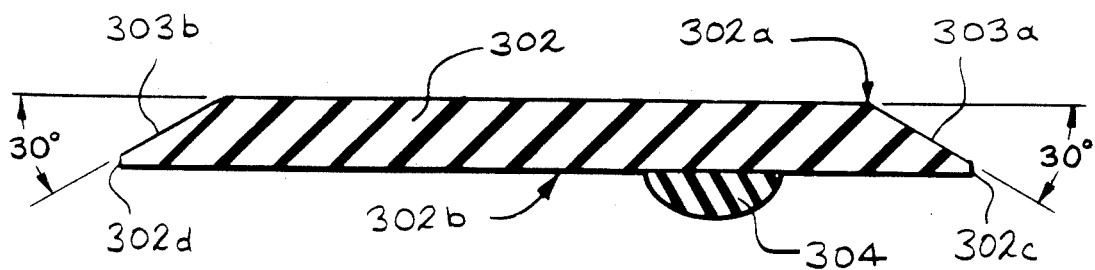
Figure 6D:
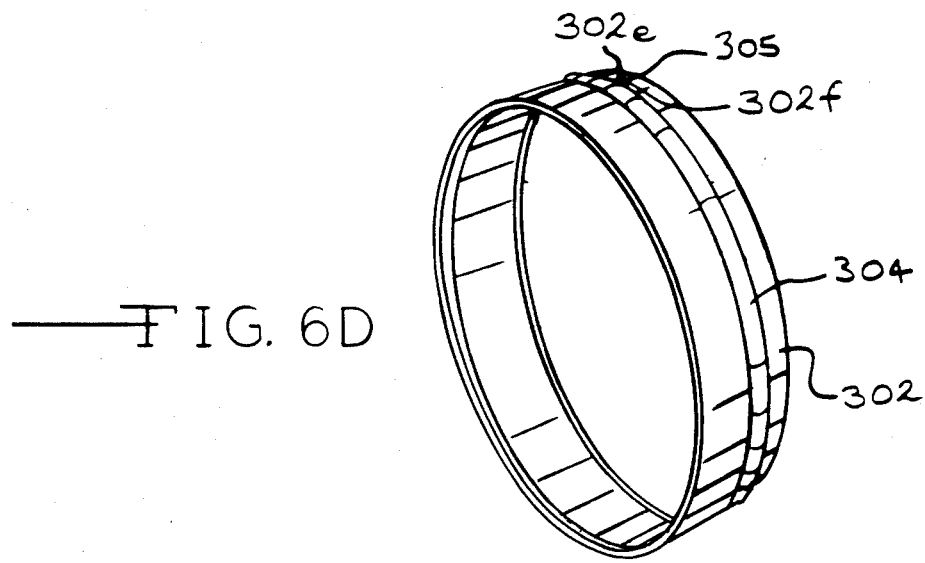
Figure 6E:
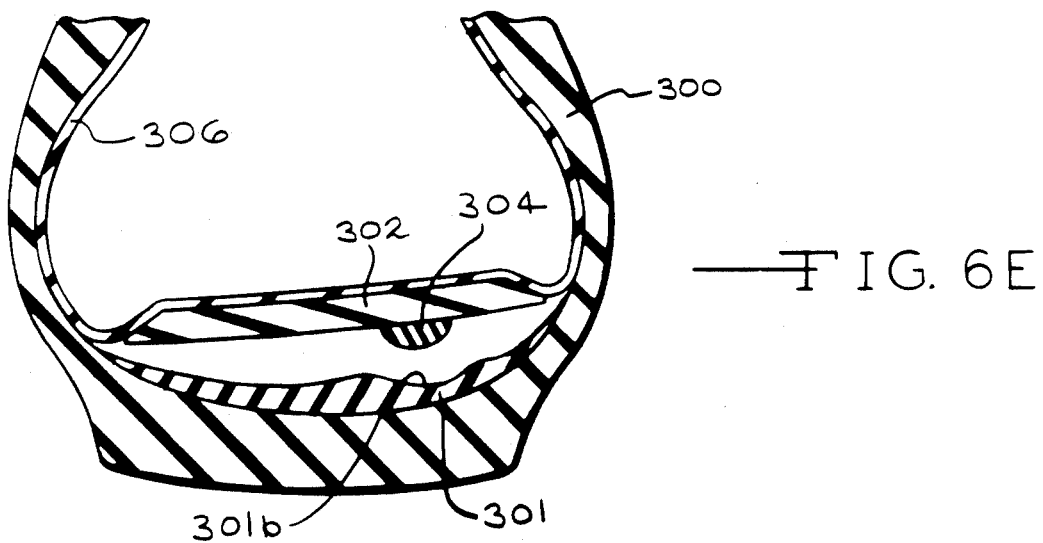
Figure 7:
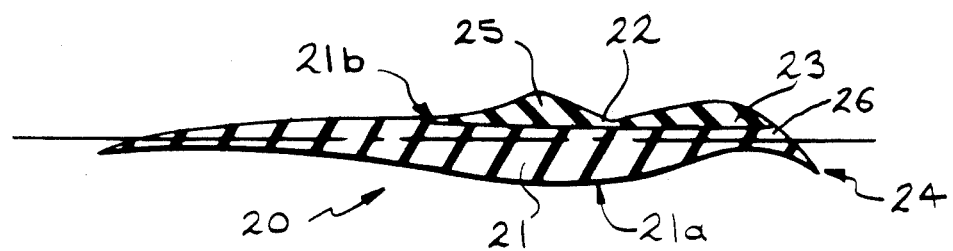

The following is a description of the molding of the preferred tire inflation device 20 as shown in FIG. 7. The method is illustrated in FIGS. 6A to 6E.

As shown in FIG. 6A, a mold is provided, preferably an old tire 300 which includes a rounded inside portion 300a. A molded rubber or other material insert 301 is placed inside the tire 300 as shown in FIG. 6B, so that the outline 301a of the inflation device 20 (FIG. 7) is produced. A recess 301b is provided as a locating means for a strip 302 of uncured rubber so that when the uncured strip 302 is properly centered, the circumference of strip 302 based upon surface 301a, is equal to a circumference of the taper portion 105 from the axis of the rim 100. The strip 302 is cut so that the wide sides 302a have tapers 303a and 303b (about 30° to 45°) towards the opposite wide side 302b. Only one taper 303a is necessary to form the edge 24 of the device 20 as will be seen. The tapers 303a and 303b are at least 1.5 inches (3.8 cm) long and end in short sides 302c and 302d which are about 1/32nd inch wide. The width between the wide sides 302a and 302b is preferably at least about ¼th inch (0.63 cm). A soft rubber raised portion 304 is bonded with rubber cement along the strip 302 of rubber about 1½ inch (3.8 cm) from edge 302c. The strip 302 has a length of about 4% less than the circumference of the insert 301. The ends 302e and 302f are cut at about a 45° angle to each other and are joined together with rubber cement with soft uncured rubber 305 between them. The strip 302 is then positioned on the insert 301 with the raised portion 304 in recess 301b. The strip 302 is held in position with an aired inner tube 306 as shown in FIG. 6E and cured preferably at 230° F. and at 35 psig for 5 hours in a curing chamber conventionally used for retreading tires. The uncured strip 302 and raised portion 304 flows into the contour of the insert 301. The resulting inflation device 20 is shown in FIG. 7. The inflation device 20 includes a body portion 21, a tapered portion 26 with edge 24 and raised portion 23. Annular lip 25 is formed by the recess 301b with a concave portion 22 between the raised portion 23 and the lip 25. As can be sseen the inflation device 20 has an integral structure with smooth flowing lines.

As can be seen, the inflation devices of the present invention provide a simple, inexpensive and safe means of mounting a tire on a rim. It will be appreciated that there can be variations of the inflation device, such as a device which is split cross-sectionally rather than bonded with uncured rubber 305 and which has holding means to form the annulus (not shown). All of these variations are intended to be included within the scope of the present invention.

I claim:

1. A device for inflating a tubeless tire (200) having two spaced apart sidewalls supporting a tread and beads (205, 206) on the sidewalls for mounting the tire on a wheel rim (100) having a longitudinal axis upon which the wheel rim and mounted tire rotate, wherein the wheel rim has two spaced apart flanges (101, 102) which engage the beads of the tire at a radial periphery of the rim from the axis and wherein the bead has a heel portion (201, 203) on the bead which is outside of the tire and a toe portion (202, 204) on the bead which is inside of the tire which comprises:

(a) an annular body portion (11, 21) with two opposing wide sides (11a, 11b, 21a, 21b) such that the body portion has an elongate cross-section, wherein one side (11a, 21a) is inside the annulus and has a diameter (d) so as to frictionally engage the flange of the wheel rim and wherein the other side (11b, 21b) is on the outside of the annulus; and (b) an annular tapered portion (13, 26) formed by the wide sides of the body portion having an annular edge (14, 24) which can engage the rim, wherein in use the device is mounted around one of the flanges of the wheel rim in contact with the heel of the bead such that (1) prior to inflation of the tire, the tapered portion of the device fits between the bead and tire rim with the outside side resting on the heel portion of the bead and so that the device simultaneously frictionally engages the flange of the wheel rim and the heel of the bead with the edge on the rim so as to allow inflation of the tire, (2) during inflation of the tire, the heel of the bead on the outside side moves the device towards the flange upon which the device is mounted and (3) upon inflation as the heel and toe of the bead seats on the flange the device is expelled from between the bead and the rim and separated from the wheel rim.

2. The device of claim 1 wherein there is a raised portion (12, 23) adjacent the edge on the outside side which is composed of a relatively softer material than the body portion upon which the heel portion of the bead rests prior to inflation of the tire.

3. The device of claim 2 wherein the body, tapered and raised portions of the device are integral and composed of a material which is flexible and elastic.

4. A device for inflating a tubeless tire (200) having two spaced apart sidewalls supporting a tread and beads (205, 206) on the sidewalls for mounting the tire on a wheel rim (100) having a longitudinal axis upon which the wheel and mounted tire rotate, wherein the wheel rim has two spaced apart flanges (101, 102) which engage the beads of the tire at a radial periphery of the rim from the axis and wherein the bead has a heel portion (201, 203) on the bead which is outside of the tire and a toe portion (202, 204) on the bead which is inside of the tire which comprises:

(a) an annular body portion (11, 21) with two opposing wide sides (11a, 11b, 21a, 21b) such that the body portion has an elongated cross-section, wherein one side (11a, 21b) is inside the annulus and has a diameter (d) so as to frictionally engage the wheel rim;

(b) an annular tapered portion (13, 26) formed by the wide sides of the body portion having an annular edge (14, 24) which can engage the rim; and (c) an annular raised portion (12, 23) adjacent the tapered portion on the body portion, wherein in use the device is mounted around one of the flanges of the wheel rim in contact with the heel of the bead such that (1) prior to inflation of the tire, the tapered portion of the device fits between the bead and tire rim with the raised portion adjacent the tapered portion resting on the heel portion of the bead and with the edge between the heel and the toe of the bead on the rim so that the device simultaneously frictionally engages the flange of the wheel rim and heel of the bead with the edge of the rim so as to allow inflation of the tire, (2) during inflation of the tire, the heel of the bead on the raised portion moves the device towards the flange upon which the device is mounted and (3) upon inflation as the heel and toe of the bead seats on the flange the device is expelled from between the bead and the rim and separated from the wheel rim.

5. The device of claim 3 wherein the body portion wide sides are curved with the side (11a) inside the annulus which frictionally engages the rim being generally concave.

6. The device of claim 3 composed of a rubber composition.

7. The device of claim 3 composed of a polyurethane rubber composition impregnated with a lubricant.

8. The device of claim 3 wherein the raised portion is rounded.

9. The device of claim 8 wherein the raised portion is secured to the body portion which is integral with the tapered portion.

10. The device of claim 9 wherein the raised portion is bonded to the body portion.

11. The device of claim 9 wherein the raised portion is a soft rubber composition and the body and tapered portion is a harder tread type rubber composition.

12. The method of inflating a tubeless tire (200) having two spaced apart sidewalls supporting a tread and beads (205, 206) on the sidewalls for mounting the tire on a wheel rim (100) having a longitudinal axis upon which the wheel rim and mounted tire rotate, wherein the wheel rim has two spaced apart flanges (101, 102) which engage the beads of the tire at a radial periphery of the rim from the axis and wherein the bead has a heel portion (201, 203) on the bead which is outside of the tire and a toe portion (202, 204) on the bead which is inside of the tire which comprises:

(a) providing an inflation device including an annular body portion (11, 21) with two opposing wide sides such that the body portion has an elongate cross-section, wherein one side (11a, 21a) is inside the annulus and has a diameter (d) so as to frictionally engage the flange of the wheel rim and wherein the other side (11b, 21b) is on the outside of the annulus; and an annular tapered portion (13, 26) formed by the wide sides of the body portion having an annular edge which can engage the rim;

(b) mounting the device around the flange with the outside of the body portion in contact with the heel of the bead and with the edge in contact with the rim, wherein the device is mounted around one of the flanges of the wheel rim in contact with the heel of the bead such that (1) prior to inflation of the tire, the tapered portion of the device fits between the bead and tire rim with the outside side resting on the heel portion of the bead and so that the device simultaneously frictionally engages the flange of the wheel rim and the heel of the bead with the edge on the rim so as to allow inflation of the tire, (2) during inflation of the tire, the heel of the bead on the outside side moves the device towards the flange upon which the device is mounted and (3) upon inflation as the heel and toe of the bead seats on the flange the device is expelled from between the bead and the rim and separated from the wheel rim; and (c) inflating the tire on the wheel rim so that the bead engages the flange.

13. The method of claim 12 wherein the body portion wide sides are curved with the side (11a, 21a) inside the annulus which frictionally engages the rim being generally concave and wherein the device curves towards the flange as it slides off the rim.

14. The method of claim 12 wherein the body and tapered portions of the device are composed of the same type of material which is flexible and elastic and the device is stretched onto the rim prior to inflation of the tire.

* * * * *